United States Patent [19]

McIntire et al.

[11] Patent Number: 4,479,632
[45] Date of Patent: Oct. 30, 1984

[54] DOLLY FOR AN AUTOMOTIVE ENGINE

[76] Inventors: Ray G. McIntire; Douglas Colvette, both of c/o Tremac Corporation, 550 Bellbrook Ave., Xenia, Ohio 45385

[21] Appl. No.: 375,053

[22] Filed: May 5, 1982

[51] Int. Cl.$^3$ ............................................. B60P 1/04
[52] U.S. Cl. .................................. 254/3 B; 254/8 B; 254/10 B; 414/743
[58] Field of Search ..................... 254/8 B, 3 B, 10 B, 254/133, 134; 414/589, 746, 917, 743, 697, 712, 733

[56] References Cited

U.S. PATENT DOCUMENTS

| | | | |
|---|---|---|---|
| 2,808,155 | 10/1957 | Boggess | 414/743 |
| 2,906,497 | 9/1959 | Wolf | 254/10 B |
| 3,630,389 | 12/1971 | Schmidt | 414/743 |
| 3,848,749 | 11/1974 | Anderson et al. | 414/917 |
| 3,850,307 | 11/1974 | Motoda | 414/917 |
| 3,995,746 | 12/1976 | Usagida | 414/917 |
| 4,099,634 | 7/1978 | McIntire et al. | 254/133 R |
| 4,266,907 | 5/1981 | Mailliet | 414/917 |
| 4,266,910 | 5/1981 | Pickard | 414/743 |
| 4,344,734 | 8/1982 | Schumaker | 414/917 |

Primary Examiner—Robert C. Watson
Attorney, Agent, or Firm—Biebel, French & Nauman

[57] ABSTRACT

A dolly for adjustably supporting an automobile engine or the like includes a frame extending substantially horizontally and having forward and rearward ends, caster wheels mounted to the forward and the rearward end of the frame, a post mounted to the rearward end of the frame and extending upwardly therefrom, a first boom member having a rearward end pivotally mounted to the post and extending toward the forward frame end, a second boom member having a rearward end pivotally attached to the first boom member forward end and extending toward the forward frame end and terminating at an end adapted to receive a workpiece, a cylinder actuator for pivoting the first boom member about the post, and a second cylinder actuator for pivoting the second boom member about the first boom member forward end. An engine attached to the second boom member is suspended above the forward end of the frame which has a sufficiently low profile to pass beneath the front of an automobile, enabling the engine to be positioned within the vehicle engine compartment beneath the hood, and the cylinder actuators enable the engine to be positioned to facilitate mounting the engine within the vehicle.

8 Claims, 8 Drawing Figures

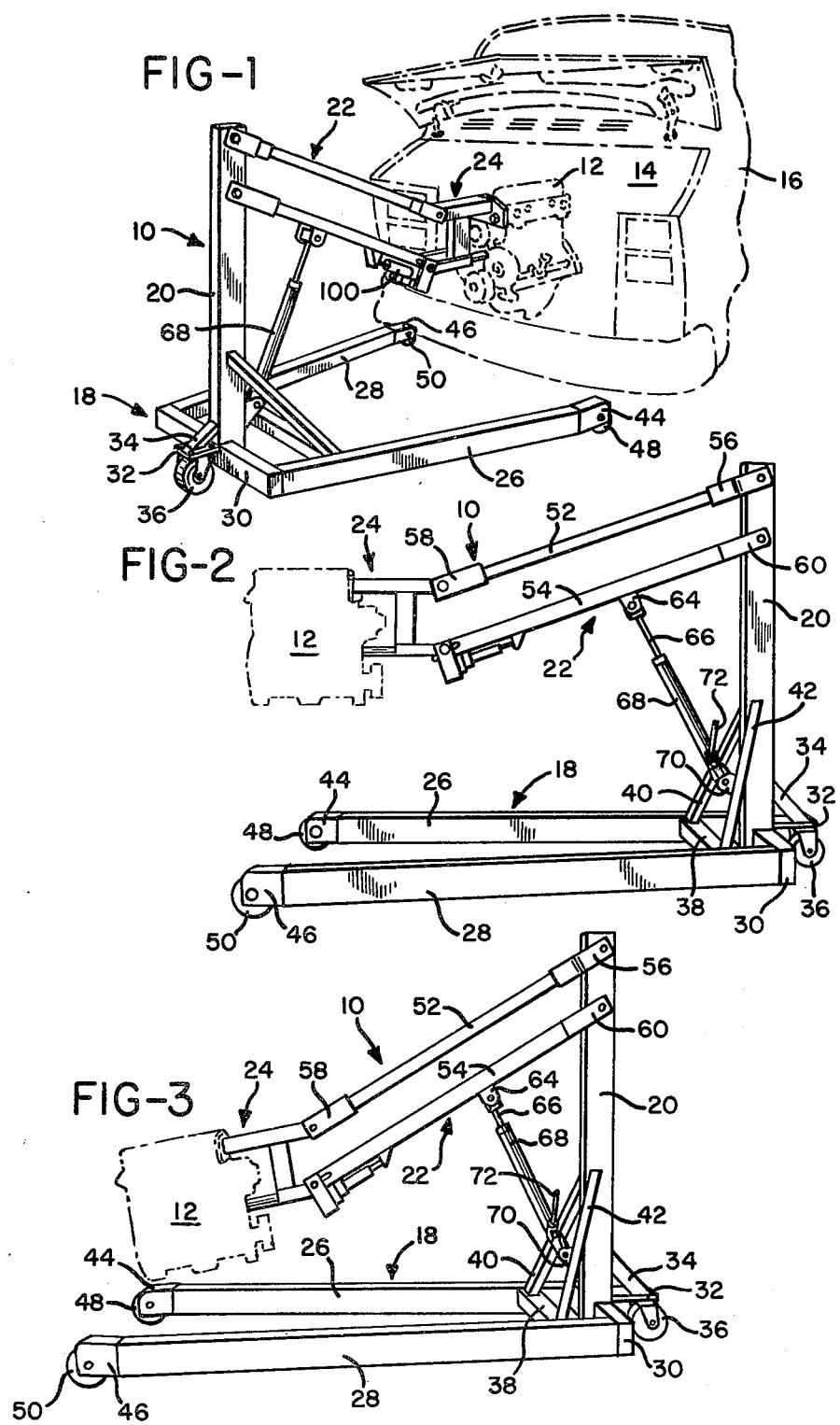

DOLLY FOR AN AUTOMOTIVE ENGINE

BACKGROUND OF THE INVENTION

The present invention relates to hand operated devices for transporting heavy workpieces and, in particular, dollies which can support and position a workpiece to facilitate its attachment to or removal from other machinery.

PRIOR ART

To repair or service motor vehicles, it is often necessary to remove the engine from the engine compartment of the vehicle so that the portion of the engine or vehicle which must be repaired may be exposed to the mechanic. After the required work has been completed, it is then necessary to place the engine back into the vehicle so that it can be mounted to the drive train, exhaust system, coolant system, and other systems and components which interface with the engine. In order to remount the engine within the vehicle, it is necessary to maintain the engine at a particular position and orientation within the engine compartment of the vehicle so that the various mountings, openings, shafts, and the like are in registry with their complementary components in the vehicle.

There are several methods and devices for accomplishing this task. For example, the engine may be removed and transported by an endless chain hoist mounted on an overhead track. With this device, the engine must be accessible from a position directly over the engine, a limitation rendering it inapplicable in situations where the engine cannot be lifted vertically from the engine compartment, such as with some vans.

After the engine is removed from the vehicle, it is necessary to transfer the engine from the hoist to a stationary stand, where the desired work is performed upon the engine. This stand is well-known in the art and comprises a tubular steel frame having brackets adapted to receive the engine, and a base mounted on casters or the like so that the engine may be transported while supported on the stand. In some embodiments of this device, the brackets are rotatably joined to the remainder of the stand so that the engine may be rotated while supported by the brackets. However, there is no equipment associated with these stands which would permit an operator to change the elevation or pitch of the supported engine. Therefore, the stand would be unsuitable for use in remounting the engine into the vehicle from which it was removed.

Another example of an apparatus utilized in removing an engine from a vehicle comprises a frame supported on casters which includes an upright member that acts as a fulcrum. A beam is pivotally mounted to the member at a midpoint and includes an end adapted to support the engine and an opposite end adapted to be grasped by at least one operator. The operator uses his own body weight to pivot the beam upwardly or downwardly to raise or lower the engine to the proper orientation within the engine compartment for removal or remounting.

A disadvantage of this type of device is that the operator must stand at a distance remote from the vehicle, thus making it difficult for him to determine whether the engine is properly oriented within the vehicle for removal or remounting. In addition, the operator must rely on his own body weight to pivot the beam, thereby increasing the effort and strength required to operate the device. Furthermore, such a device does not include means for changing the orientation of the engine independently of its elevation above the floor of the working area, thus limiting its application.

Accordingly, there is a need for a dolly for supporting an automotive engine or the like which is capable of raising and lowering an engine to facilitate its removed from or remounting into an engine compartment of a vehicle. In addition, there is a need for a device which can be operated by a single operator who may be positioned adjacent the vehicle and who does not have to exert a great deal of physical effort to operate the device.

SUMMARY OF THE INVENTION

The present invention provides a dolly for adjustably supporting an engine or the like which is capable not only of raising and lowering the engine above the floor of the working area, but changing the pitch of the engine independently of its elevation, thus facilitating the engine's removal from or remounting to the vehicle. In addition, the dolly of the present invention enables the operator to stand adjacent the vehicle while manipulating the dolly so that he may determine the desired pitch and elevation of the engine more accurately. Furthermore, the pitch and elevation of the engine may be changed by a single operator without requiring the operator to use his body weight or excessive strength.

The present invention is a dolly for adjustably supporting an engine or the like and comprises a frame extending substantially horizontally and having forward and rearward ends, casters mounted on the forward and rearward ends of the frame, a post mounted to the rearward end of the frame and extending upwardly therefrom, a first boom member having a rearward end pivotally mounted to the post and extending toward the forward frame end, a second boom member having a rearward end pivotally attached to the forward end of the first boom member and extending toward the forward frame end, a cylinder actuator for pivoting the first boom member about the post, and a second cylinder actuator for pivoting the second boom member about the first boom member. The forward end of the second boom member is adapted to receive an engine from a vehicle and is positioned above the frame such that the center of gravity of the device when supporting an engine is well within the area bounded by the frame and casters, thus promoting stability.

The cylinder actuators which position the first and second boom members preferably are hand-operated, single acting hydraulic cylinder actuators. The cylinder actuator for positioning the first boom member preferably is pivotally mounted to the post and extends upwardly to a pivotal connection with the first boom member. The second cylinder actuator preferably is connected to the first boom member and extends to the second boom member.

Although in the preferred embodiment, the cylinder actuators are described as comprising hand-operated, single acting, hydraulic cylinder actuators, other types of devices may be used. For example, devices similar to ratchet-type jacks such as those sold with most automobiles may be used. A device similar to a screw jack may also be used. Pneumatic or hydraulic cylinder actuators driven by a remote source of compressed air or hydraulic fluid may be used, so that an operator need only position a valve to orient the first and second boom members to their desired positions.

In the preferred embodiment, the first boom member comprises upper and lower beams, each having a forward end and a rearward end pivotally connected to the post. The second boom member preferably includes an upper stub which is pivotally attached to the forward end of the upper beam and a lower clevis pivotally attached to the forward end of the lower beam. The forward end of the lower beam defines an elongate slot therethrough and the clevis includes a pivot pin which slidably engages the slot.

The second cylinder actuator for positioning the second boom member includes a slide member which is pivotally attached to the pivot pin and slidably engages the forward end of the lower beam. The slide member includes a guide plate which is positioned beneath the lower beam, and slidably engages the underside of the lower beam thus constraining movement of the slide member to a linear movement. The second cylinder actuator is mounted to the slide member and includes a rod which extends rearwardly from the slide member and abuts a bracket mounted to the underside of the lower beam.

Thus, by displacing the rod of the second actuator, the slide member is displaced relative to the lower beam, causing the clevis of the lower boom member alternately to move away from or toward the lower boom member. This movement causes the second boom member to rotate about the pivotal connection between the upper beam and the stub, thus causing the engine to change its pitch orientation.

Although the foregoing discussion and the discription of the preferred embodiment of the invention describe the invention as a dolly designed for supporting an automotive engine, it should be understood that the dolly of the present invention can be adapted to support any type of workpiece. Therefore, the dolly of the present invention has numerous applications in industry other than in the automotive area.

Accordingly, it is an object of the present invention to provide a dolly for an automotive engine or the like in which the elevation and pitch of the supported workpiece may be varied to orient the workpiece at a predetermined position and location; to provide a dolly in which the pitch and elevation of the workpiece can be adjusted independently of each other; to provide a dolly in which the elevation and pitch of the supported workpiece may be changed without the exertion of excessive physical force or without requiring the use of the body weight of the operator; and to provide a dolly for supporting a workpiece in which the operator may position himself adjacent the dolly and workpiece which is supported.

Other objects and advantages of the invention will be apparent from the following description, the accompanying drawings and the appended claims.

BRIEF DESCRIPTION OF THE DRAWINGS

FIG. 1 is a rear perspective view of the dolly of the preferred embodiment, shown supporting an engine in phantom and positioned adjacent a vehicle in phantom;

FIG. 2 is a side perspective view of the dolly of FIG. 1 shown supporting an engine in phantom in which the boom members are raised;

FIG. 3 is a side perspective view of the dolly of FIG. 1 shown supporting an engine in phantom in which the boom members are lowered;

DETAILED DESCRIPTION OF THE PREFERRED EMBODIMENT

Figure 4:
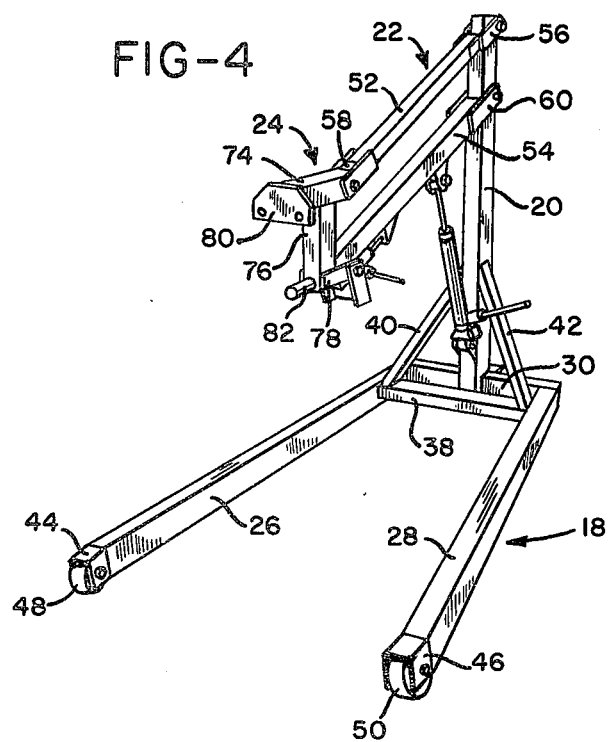
FIG. 4 is a front perspective view of the dolly of FIG. 1.
Figure 5:
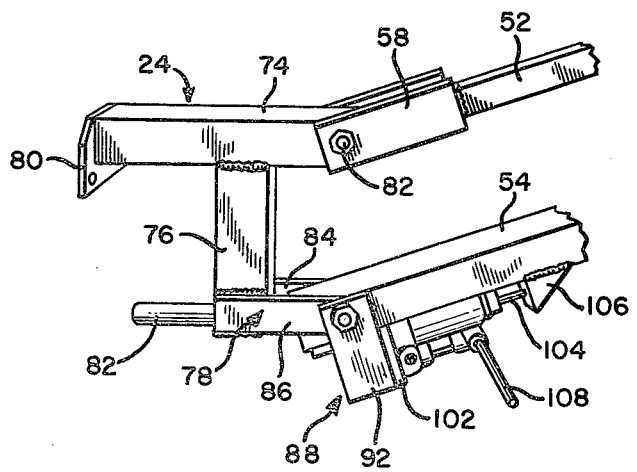
FIG. 5 is a detail of the dolly of FIG. 1 showing the connection between the first and second boom members.
Figure 6:
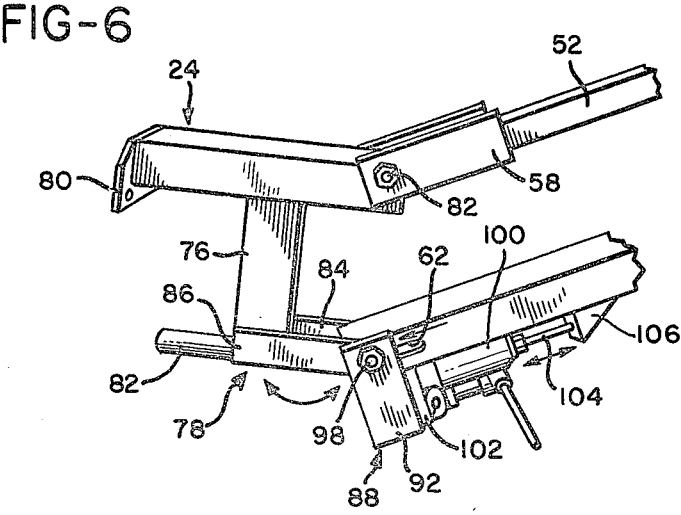
FIG. 6 is a detail of the connection of FIG. 5 in which the second boom member has been pivoted relative to the first boom member.
Figure 7:
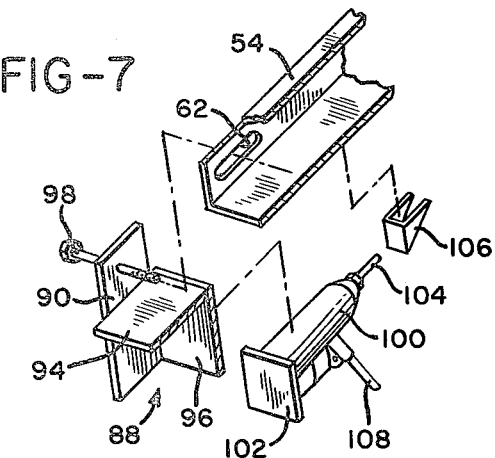
FIG. 7 is an exploded view of a detail of the dolly of FIG. 1, showing the connection between the slide member and the lower beam in which the slide member and lower beam are both broken away.

As shown in FIG. 1, the dolly of the preferred embodiment, generally designated 10, is adapted to support an automotive engine 12 for mounting or removal within the engine compartment 14 of a motor vehicle such as a van 16. As shown in FIGS. 1, 2, and 3, the dolly 10 includes a frame 18, a post 20, a first boom member 22, and a second boom member 24.

As shown in FIGS. 1-4, the frame 18 includes a pair of opposing legs 26, 28 which are oriented substantially horizontally to the floor of the work area and are joined at their rearward ends by a cross member 30. As best shown in FIG. 4, the legs 26, 28 are arranged substantially parallel to each other, but diverge outwardly at their forward ends to provide a broader base of support directly beneath the engine 12 (FIGS. 1-3).

The cross member 30 supports the post 20 at a position midway between the rearward ends of the opposing legs 26, 28. The cross member also includes a bracket 32 and supporting strut 34 which extend rearwardly from the cross member 30 immediately adjacent the post. A rear caster wheel 36 is pivotally mounted to the bracket 32. A second cross member 38 is mounted forwardly of the cross member 30 and extends between the opposing legs 26, 28. Supporting struts 40, 42 are mounted to the second cross member 38 and extend upwardly to the post 20. The second cross member 38 and struts 40, 42 form a triangle with the post at an apex to provide a stiffening structure for the post.

The forward ends of the opposing legs 26, 28 include housings 44, 46 which support caster wheels 48, 50, respectively. As best shown in FIG. 4, the housings 44, 46 preferably are angled slightly with respect to their adjoining legs 26, 28 so that the caster wheels 48, 50 are oriented parallel to one another. The legs 26, 28 and caster wheels 36, 48, 50 have a low profile suitable for rolling under the engine compartment of a vehicle.

The first boom member 22 includes an upper beam 52 and a lower beam 54. The upper beam 52 is pivotally mounted at its rearward end to the post 20 by a clevis 56. The upper beam 52 includes a forward end terminating in a clevis 58.

Figure 8:
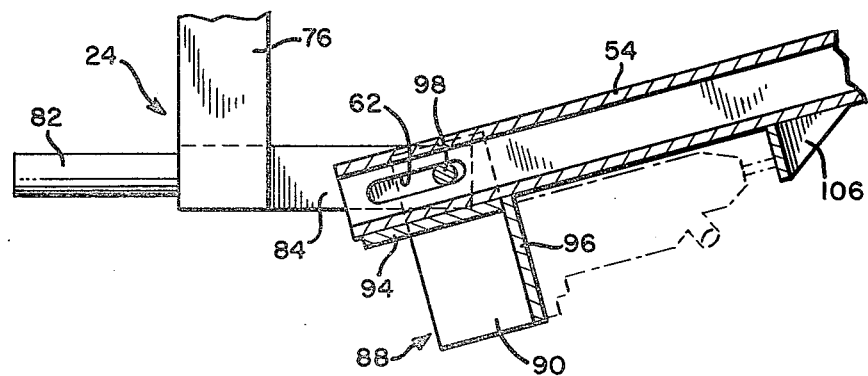
FIG. 8 is a detail of the dolly of FIG. 1 in which both the lower beam and slide member are shown in section and the cylinder actuator is in phantom.

The lower beam 54 is pivotally attached to the post 20 at its rearward end by clevis 60. As shown in FIGS. 2, 3, and 8, the forward end of the lower beam 54 defines a slot 62 which extends transversely through the beam. The lower beam 54 also includes a bracket 64 which is pivotally connected to the rod 66 of a hand-operated, single acting, hydraulic cylinder actuator 68. The base of the cylinder actuator 68 is pivotally mounted to the post 20 by a bracket 70 which is attached to a forward wall of the post.

The cylinder actuator 68 includes a pump handle 72 which extends outwardly toward the side of the frame 18, so that the cylinder actuator can be pumped by an operator to displace the rod 66 outwardly from the actuator. The cylinder actuator 68 preferably is of conventional design and includes means (not shown) for bleeding fluid from the cylinder to enable the rod 66 to retract into the cylinder actuator in response to the weight of the boom members 22, 24.

As shown in FIGS. 5, 6, 7, and 8, the second boom member 24 includes an upper stub 74, a spacing bar 76, and a lower clevis 78. The upper stub is oriented substantially horizontally and includes a mounting flange 80 at its forward end, and it is pivotally mounted to the clevis 58 of the upper beam 52 at its rearward end by pivot pin 82.

The spacer bar 76 is mounted at an upper end to the underside of the stub 74 at approximately its mid-portion. The lower end of the spacer bar 76 forms a portion of the clevis 78. A cylindrically shaped lower bracket member 82 extends forwardly from a forward surface of the spacer bar 76. As shown in FIGS. 2, 3, and 4, the mounting bracket 80 and lower bracket member 82 are shaped and positioned with respect to each other to receive an automotive engine 12. The clevis 78 includes clevis members 84, 86 which are spaced apart to slidably engage the forward end of the lower beam 54 and include holes (not shown) which may be placed in registry with the slot 62.

A slide member 88 is slidably mounted to the forward end of the lower beam 54 and includes a pair of opposing side plates 90, 92 separated by a slide plate 94, and a mounting plate 96. The width of the slide plate 94 is sufficient to space the side plates 90, 92 at a distance such that they can be fitted outside of the clevis members 84, 86 of the clevis 78. The slide plate 94 includes a substantially flat upper surface which slidably engages the substantially flat underside of the forward end of the lower beam 54. The side plates 90, 92 each define a hole (not shown) which is so located that a pivot pin 98 may be passed through the side plates 90, 92, the clevis members 84, 86, and slot 62, thereby mounting the slide plate and clevis 78 to the lower beam 54.

A hand-operated, single acting, hydraulic cylinder actuator 100 of conventional design includes a base 102 which is mounted to the mounting plate 96 of the slide member 88 and a rod 104 which is mounted to a bracket 106. The bracket 106 is attached to the underside of the lower beam 54. The cylinder actuator 100 includes a handle 108 which may be pumped to displace the rod 104 outwardly from the cylinder actuator. The cylinder actuator 100 also includes means (not shown) for permitting the rod 104 to be retracted by the weight of the boom member 24.

Thus, as the rod 104 of the cylinder actuator 100 is extended (FIG. 6), the slide member 88 is displaced forwardly with respect to the lower beam 54. The camming engagement of the slide plate 94 and the underside of the lower beam 54 prevents the slide plate from pivoting with respect to the lower beam 54 about pin 98 and limits its movement to linear movement. Extension of the rod 104 from the cylinder actuator 100 causes the slide plate and pivot pin 98 to be displaced forwardly with respect to the lower beam 54, thereby causing the clevis 78, which is also connected to pivot pin 98, to be displaced. Displacement of the clevis 78 causes the second boom member 24 to rotate about pivot pin 82 and change the pitch of a workpiece mounted to the forward end of the second boom member.

The operation of the dolly 10 is as follows. In order to remove a workpiece such as an engine 12 from an enclosed space such as the engine compartment 14 of a van 16, the grille, radiator, and other equipment in front of the engine (not shown) are first removed to permit frontal access to the engine. The dolly 10 is then advanced to the van 16 so that the legs 26, 28 are beneath the van and the forward end of the second boom member 24 is positioned adjacent the engine 12. To enable the engine to be mounted to the mounting brackets 80, 82, the cylinder actuator 68 is actuated to raise or lower the first boom member 22 to the desired height. Next, the cylinder actuator 100 is actuated to orient the second boom member 24 to the appropriate pitch. The mounting bracket 80 can then be attached to the engine 12.

Once the engine has been attached to the mounting bracket 80, it may be disconnected from the other equipment in the engine compartment 14 since it may now be supported entirely by the dolly 10. In order to remove the engine 12 from the engine compartment 14, it may be necessary to elevate the engine above portions of the van 16 such as a front bumper or the like. To accomplish this, the cylinder actuator 68 is pumped by handle 72, thereby raising the first boom member 22 and engine 12 to the desired height. Further adjustments of the position of the engine may be accomplished by actuating the cylinder actuator 100 to change the pitch of the engine 12 to facilitate its removal from the engine compartment 14.

The position of the engine 12 while in the engine compartment 14 is shown in FIG. 3. After being removed from the engine compartment 14, the engine may be elevated to an appropriate height for its servicing, as shown in FIG. 2. It should be noted that, at all elevations, the engine 12 is located rearwardly of the forward caster wheels 48, 50 so that there is no chance that the center of gravity of the combination of the engine and dolly 10 will fall outside of the points of support of the frame defined by the rear caster wheel 36 and forward caster wheels. Once the engine 12 has been removed from the engine compartment 14, the dolly 10 may be transported to a location remote from the van 16 by a single operator, since the effort required to move the dolly is well within range of human strength.

To remount the engine 12 within the engine compartment 14 of the van 16 pictured in FIG. 1, the sequence of operation is substantially reversed. The dolly 10 is advanced to the engine compartment 14, and the cylinder actuator 68 is adjusted to position the engine 12 at the desired height. The cylinder actuator 100 is then actuated to orient the pitch of the engine 12 to the desired angle with respect to the horizontal. The dolly 10 is then inched forward, and the engine 12 at each step can be elevated or pitched to accommodate restrictions in the opening to the engine compartment. Once the engine 12 is substantially positioned within the engine compartment 14, fine adjustments may be made by actuating either cylinder actuator 68 or cylinder actuator 100 to bring the engine 12 into registry with the various components of the van 16 such as the exhaust manifold, water hoses, drive train, etc.

The dolly 10 preferably is fabricated from tubular steel having a generally rectangular cross section. Thus each component of the dolly may be welded to its adjoining component, thereby providing an extremely rigid and strong structure. The cylinder 68 and cylinder actuator 100 both are of conventional design and are readily available from both industrial and domestic suppliers. It is understood that other means of displacing the first boom member 22 and second boom member 24 may be employed and not depart from the scope of the invention. For example, devices similar either to a ratchet-type jack or a screw type jack may be employed, as well as devices employing remote power sources rather than manual power.

While the form of apparatus herein described constitutes a preferred embodiment of this invention, it is to be understood that the invention is not limited to this precise form of apparatus, and that changes may be made therein without departing from the scope of the invention.

What is claimed is:

1. A dolly for adjustably supporting an engine or like workpiece, comprising:

a frame extending substantially horizontally and having a forward end and a rearward end;

caster means mounted to said forward end and said rearward end of said frame;

a post mounted to said rearward end of said frame and extending upwardly therefrom;

a first boom member having a rearward end pivotally mounted to said post, and extending toward said forward frame end and terminating at a forward end;

a second boom member having a rearward end pivotally attached to said first boom member forward end, and extending toward said forward frame end and terminating at an end adapted to receive a workpiece;

means for pivoting said first boom member about said post;

said first boom member includes upper and lower beams, each having a forward end comprising said first boom member forward end, and a rearward end pivotally attached to said post and comprising said first boom member rearward end;

said second boom member rearward end includes an upper stub pivotally attached to said upper beam forward end and a lower clevis pivotally and slidably attached to said lower beam forward end; and means for sliding said lower clevis relative to said lower beam forward end such that said second boom member pivots about said upper beam forward end so that said second boom member may be oriented relative to the horizontal independently of the orientation of said first boom member to the horizontal.

2. The dolly of claim 1 wherein said lower beam defines an elongate slot therethrough at said forward end thereof, and said clevis includes a pivot pin slidably engaging said slot.

3. A dolly for adjustably supporting an engine or like workpiece, comprising:

frame extending substantially horizontally and having a forward end and a rearward end;

caster means mounted to said forward end and said rearward end of said frame;

a post mounted to said rearward end of said frame and extending upwardly therefrom;

a first boom member having upper and lower beams, said beams having rearward ends pivotally mounted to said post and forward ends extending toward said forward frame end, said lower beam having an elongate slot therethrough at said forward end thereof;

a second boom member having a rearward end with an upper stub pivotally attached at a rearward end thereof to said upper beam forward end and a lower clevis having a pivot pin pivotally and slidably mounted within said slot, said second boom member extending toward said forward frame end and terminating at an end adapted to receive a workpiece;

means for pivoting said first boom member about said post; and means for displacing said pivot pin within said slot, whereby said second boom member pivots about said upper beam forward end.

4. The dolly of claim 4 wherein said pivot pin displacing means comprises;

a slide member pivotally attached to said pivot pin and slidably engaging said lower beam; and first actuator means attached to said lower beam and said slide member such that extension or contraction of said first actuator means causes displacement of said slide member and said pivot pin relative to said lower beam, thereby causing said second boom member to pivot about said upper beam forward end.

5. The dolly of claim 4 wherein said lower beam includes a bottom bearing surface; and said slide member includes a slide plate positioned to slidably engage said bearing surface, such that displacement of said slide member by said first actuator means is constrained by said slide plate to a linear movement.

6. The dolly of claim 5 wherein said first boom member pivoting means comprises second actuator means rotatably joined to and extending between said post and said lower beam such that extension or contraction of said first actuator means causes said upper and lower beams to rotate about said post., 7. The dolly of claim 6 wherein said frame comprises:

a pair of tubular legs extending substantially horizonally, having forward ends comprising said frame forward end and having rearward ends comprising said frame rearward end;

a cross member extending between and attached to said rearward ends of said legs, said cross member supporting said post; and said legs diverging outwardly from said cross member and oriented such that said first and second boom members are positioned above and between said legs.

8. The dolly of claim 7 wherein said caster means comprises a pair of forward wheels, each rotatably mounted to a different one of said forward ends of said legs, and rear wheel rotatably and pivotally mounted to said frame rearwardly of said cross member and adjacent said post.

* * * * *

UNITED STATES PATENT AND TRADEMARK OFFICE
CERTIFICATE OF CORRECTION

PATENT NO. : 4,479,632

DATED : October 30, 1984

INVENTOR(S) : Ray G. McIntire & Douglas Colvette

It is certified that error appears in the above-identified patent and that said Letters Patent is hereby corrected as shown below:

Column 8, line 1, "frameand" should be --frame and--.

Column 8, line 22, "4" (second occurrence) should be --3--.

Column 8, line 43, "first" should be --second--.

Column 8, line 58, "eachrotatably" should be --each rotatably--.

Signed and Sealed this

Twenty-eighth Day of May 1985

[SEAL]

Attest:

DONALD J. QUIGG

*Attesting Officer*    *Acting Commissioner of Patents and Trademarks*